Patented Feb. 20, 1940

2,191,094

UNITED STATES PATENT OFFICE 2,191,094

AZO DYESTUFFS, ETC.

Bernard Herstein, Brooklyn, N. Y., assignor to U. S. Industrial Alcohol Company, New York, N. Y., a corporation of West Virginia No Drawing. Application August 11, 1937, Serial No. 158,475

17 Claims. (Cl. 8—50)

This invention relates to new dyestuffs and to methods of producing the same and to the dyeing of cellulose acetate therewith.

The new azo dyestuffs are made by coupling a diazotized para-substituted ortho-nitranilin, substituted in para position by chlorine or a methyl group, with alkyl esters of acids such as acetone-oxalic and oxal-acetic acids. The substituted ortho-nitranilin compounds have the general formula

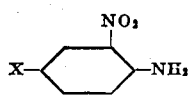

where X is a member of the group consisting of chlorine and methyl. The new dyestuffs in general can be considered to have the following formula: $R-N=N-R_1$, where R is the residue of the diazotized ortho-nitranilin compound and $R_1$ is the residue of the alkyl ester of an acid such as acetone-oxalic acid or oxal-acetic acid. These new dyestuffs are particularly advantageous for dyeing cellulose acetate.

The alkyl esters of the acids used in making new dyestuffs are readily obtainable for example by the so-called Claisen condensation by condensing the proper esters, or an ester and ketone, with the use of metallic sodium or sodium alkoxide with the resulting production of alkyl esters of sodio acids; and these intermediate sodio compounds of the compounds, when sufficiently stable, are advantageously used, without first isolating the esters of the acids, for coupling with the diazonium chloride which results from the diazotization of the meta-nitro-para-toluidine.

The alkyl esters of the acids used in making the new dyestuffs include methyl, ethyl and other alkyl esters of acids such as alkyl acetone-oxalates and alkyl oxal-acetates.

The invention will be further illustrated by the following specific examples, but it is intended and will be understood that the invention is not limited thereto:

EXAMPLE I.—*Azo dyestuff from m-nitro-p-toluidine and ethyl sodio-acetone-oxalate*

Meta-nitro-para-toluidine (15.2 lbs.) is diazotized by suspending it in 12 gallons of ice-cooled water containing 30.6 lbs. concentrated HCl (sp. gr. 1.19). A concentrated aqueous solution of sodium nitrite (7 lbs.) is then added with stirring and cooling until a permanent positive test for free nitrous acid is obtained with potassium iodide starch paper. The temperature of the diazo solution is kept at 0°–5° C. When the reaction is completed the solution is filtered if necessary. The diazo solution is then added to a cold solution of 20 lbs. (2 lbs. excess) of the sodio salt of ethyl acetyl pyruvate $$(CH_3C(ONa):CHCO.COOC_2H_5)$$

in about 110 gallons of water, to which sufficient sodium acetate is added to counteract the deleterious effect of the mineral acid.

The coupled suspension should be agitated for about 30 minutes, then filtered, and the dye washed thoroughly with cold water. Air drying gives a finely divided bright yellow body of 2-nitro-4-methyl-benzol-azo-acetone-oxalic acid ethyl ester.

The reaction involved in the production of the new dyestuff, and a graphic representation of the formula of the new dyestuff in its tautomeric modifications, is illustrated by the following equation:

$$CH_3C(ONa):CHCOCOOEt + ClN:NC_6H_4NO_2CH_3$$

Sodio-ethyl-acetyl-pyruvate    Diazotized m-nitro-p-toluidine

2-nitro-4-methyl-benzol-azo-acetone-oxalic acid ethyl ester

EXAMPLE II.—*Azo dyestuff from m-nitro-p-toluidine and ethyl sodio-oxal-acetate*

Meta-nitro-para-toluidine is diazotized as described in the preceding example and the diazo solution is similarly added to a cold solution of ethyl sodio-oxal-acetate, using an equivalent quantity to the quantity of ethyl sodio acetyl pyruvate in Example I.

The reaction and the graphically represented formula of the product in its tautomeric modifications are indicated by the following equation:

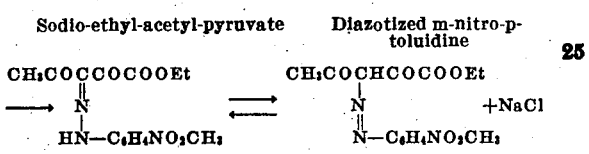

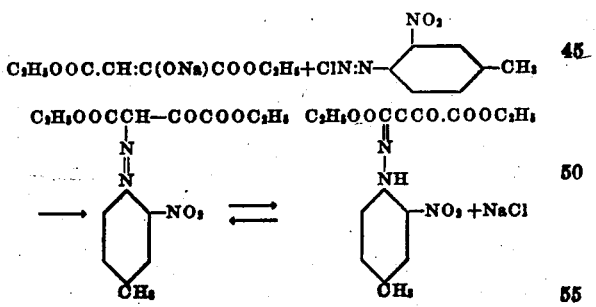

EXAMPLES III and IV.—*Azo dyestuffs from p-chlor-o-nitranilin*

Para-chlor-ortho-nitranilin is diazotized in a manner similar to that described in Example I for the diazotization of meta-nitro-para-toluidine, using 17.3 lbs. of the p-chlor-o-nitranilin instead of 15.2 lbs of the m-nitro-p-toluidine, and the resulting diazo solution is then added to a cold solution of the alkyl ester of the acid used in a manner similar to that described in the above examples. That is, the diazo solution is added to a cold solution of the sodio salt of ethyl acetyl-pyruvate or to a cold solution of ethyl sodio-oxal-acetate, in a manner similar to that described in the above examples and giving dyes of similar composition but containing chlorine instead of the methyl group in para position in the nitranilin residue.

In the above examples the ethyl esters are used in each case but similar results can be obtained with the methyl or other esters. Although the above examples refer to the use of the sodio compounds of the alkyl esters of acetone-oxalic and oxal-acetic acids, it is to be understood that the free esters, i. e., the non-sodio compounds, may also be used in preparing the new dyestuffs, the procedure when using these compounds being the same as with the sodio compounds.

Where the intermediate sodio-compounds of the alkyl esters of the acids used are stable, these intermediates are advantagously used, without isolation of the free ester, as illustrated in the examples above. In this case the combination or coupling is between the intermediate and the diazonium chloride. In proceeding in this way, the isolation of the ester is unnecessary and the intermediate sodio compound is directly used for coupling with the diazonium chloride in making the dyestuff.

The new azo dyestuffs are particularly advantageous, as above stated, for dyeing cellulose acetate and appear to be specific for cellulose acetate fibers and fabrics. They do not dye either cotton or viscose and, if they dye silk or wool at all, the materials so dyed are very unstable toward soap solutions.

Cellulose acetate is readily dyed with the new dyestuffs with dispersing of the dyestuff as completely as possible in water, using a suitable dispersing agent, such as sulfonated oils. The temperature of the dye bath during dyeing is kept e. g. around 70° C. and the period of dyeing ranges in general from around one-half hour up to one hour. The quantity of dyestuffs to be used depends of course on the shade desired and ranges in general from 1 to 4% of the weight of the material to be dyed. The concentration of the dye in the dye bath is of the order of approximately one-tenth of one per cent.

Cellulose acetate is dyed with the new dyes a bright yellow color of good fastness.

I claim:

1. New azo dyestuffs obtainable by coupling a diazotized para-substituted ortho-nitranilin, substituted in para position by a member of the group consisting of chlorine and methyl, with a compound from the group consisting of the esters of acetone-oxalic acid and oxal-acetic acid, said dyes being valuable dyes for dyeing cellulose acetate.

2. New azo dyestuffs obtainable by coupling a diazotized para-substituted ortho-nitranilin, substituted in para position by a member of the group consisting of chlorine and methyl, with alkyl esters of acetone oxalic acid, said dyes having the following general formula: R—N=N—R$_1$, where R is the residue of the diazotized p-substituted o-nitranilin and R$_1$ is the residue of the alkyl ester of the acetone oxalic acid, said dyes being valuable dyes for dyeing cellulose acetate.

3. New azo dyestuffs obtainable by coupling a diazotized para-substituted ortho-nitranilin, substituted in para position by a member of the group consisting of chlorine and methyl, with ethyl acetone oxalate, said dyes having the following general formula: R—N=N—R$_1$, where R is the residue of the diazotized p-substituted o-nitranilin and R$_1$ is the residue of the ethyl acetone-oxalate, said dyes being valuable dyes for dyeing cellulose acetate.

4. New azo dyestuffs obtainable by coupling a diazotized para-substituted ortho-nitranilin, substituted in para position by a member of the group consisting of chlorine and methyl, with alkyl esters of oxal-acetic acid, said dyes having the following general formula: R—N=N—R$_1$, where R is the residue of the diazotized p-substituted o-nitranilin and R$_1$ is the residue of the alkyl ester of oxal-acetic acid.

5. New azo dyestuffs obtainable by coupling a diazotized para-substituted ortho-nitranilin, substituted in para position by a member of the group consisting of chlorine and methyl, with ethyl oxal-acetate, said dyes having the following general formula: R—N=N—R$_1$, where R is the residue of the diazotized p-substituted o-nitranilin and R$_1$ is the residue of ethyl oxal-acetate, said dyes being valuable dyes for dyeing cellulose acetate.

6. The method of making new azo dyestuffs which comprises coupling a diazotized para-substituted ortho-nitranilin, substituted in para position with a member of the group consisting of chlorine and methyl, with an alkyl ester of acetone oxalic acid.

7. The method of making new azo dyestuffs which comprises coupling a diazotized para-substituted ortho-nitranilin, substituted in para position with a member of the group consisting of chlorine and methyl, with ethyl acetone-oxalate.

8. The method of making new azo dyestuffs which comprises coupling a diazotized para-substituted ortho-nitranilin, substituted in para position with a member of the group consisting of chlorine and methyl, with an alkyl ester of oxal-acetic acid.

9. The method of making new azo dyestuffs which comprises coupling a diazotized para-substituted ortho-nitranilin, substituted in para position with a member of the group consisting of chlorine and methyl, with ethyl oxal-acetate.

10. The method of making new azo dyestuffs which comprises reacting a diazotized para-substituted ortho-nitranilin, substituted in para position with a member of the group consisting of chlorine and methyl, with the sodio compound of an alkyl ester of acetone-oxalic acid.

11. The method of making new azo dyestuffs which comprises reacting a diazotized para-substituted ortho-nitranilin, substituted in para position with a member of the group consisting of chlorine and methyl, with the sodio compound of an alkyl ester of oxal-acetic acid.

12. The method of making new azo dyestuffs which comprises coupling a diazotized para-substituted ortho-nitranilin, substituted in para position with a member of the group consisting of chlorine and methyl, with a compound from the group consisting of the esters of acetone-oxalic acid and oxal-acetic acid.

13. The method of dyeing cellulose acetate which comprises dyeing the same with the new dyestuffs defined in claim 1.

14. The method of dyeing cellulose acetate which comprises dyeing the same with the new dyestuffs defined in claim 2.

15. The method of dyeing cellulose acetate which comprises dyeing the same with the new dyestuffs defined in claim 3.

16. The method of dyeing cellulose acetate which comprises dyeing the same with the new dyestuffs defined in claim 4.

17. The method of dyeing cellulose acetate which comprises dyeing the same with the new dyestuffs defined in claim 5.

BERNARD HERSTEIN.

CERTIFICATE OF CORRECTION.

Patent No. 2,191,094.  February 20, 1940.

BERNARD HERSTEIN.

It is hereby certified that error appears in the printed specification of the above numbered patent requiring correction as follows: Page 1, first column, line 30-31, strike out the words "compounds of the" and insert the same before "acids;" in line 30; and that the said Letters Patent should be read with this correction therein that the same may conform to the record of the case in the Patent Office.

Signed and sealed this 2nd day of April, A. D. 1940.

(Seal)
Henry Van Arsdale,
Acting Commissioner of Patents.